Patented Nov. 24, 1931

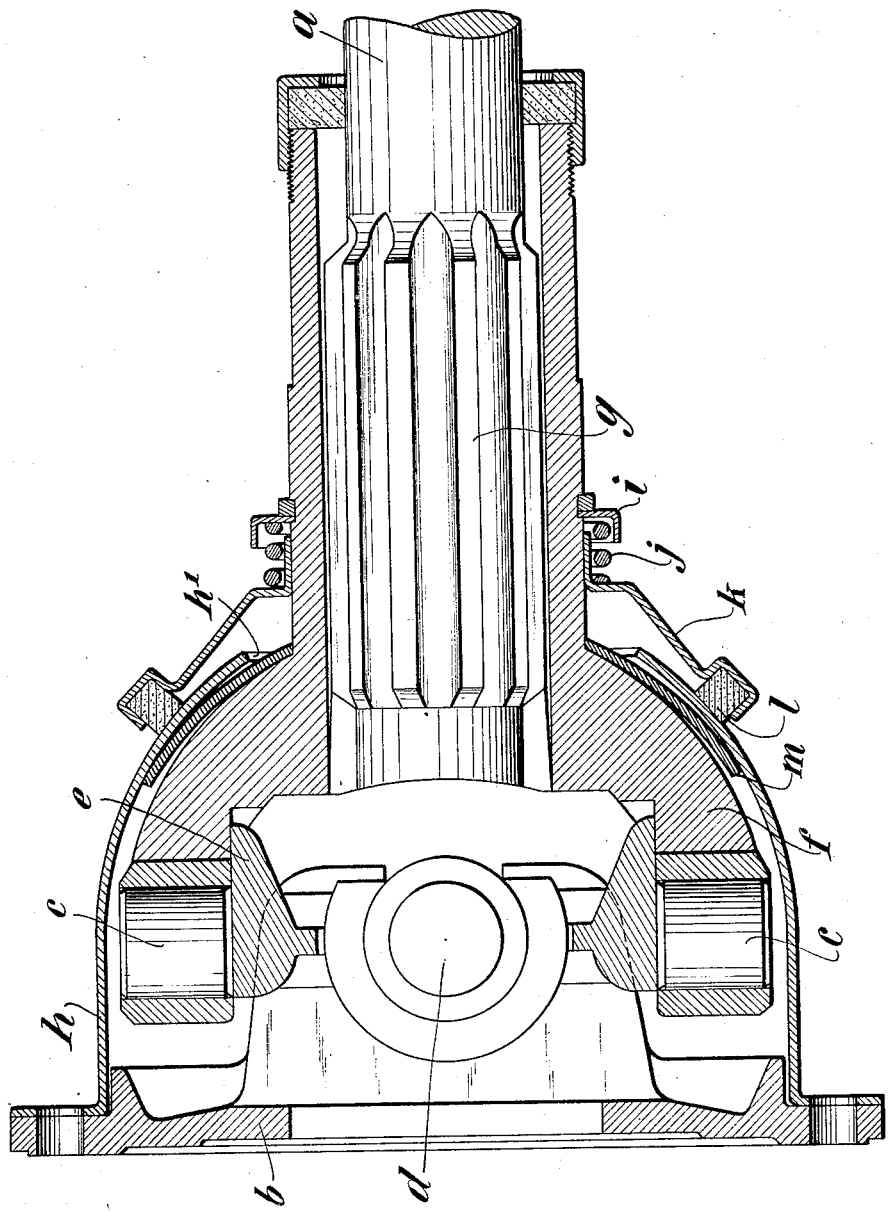

1,833,051

UNITED STATES PATENT OFFICE

AUGUST H. LEIPERT, OF COLLEGE POINT, NEW YORK, N. Y., ASSIGNOR TO INTERNATIONAL MOTOR COMPANY, OF NEW YORK, N. Y., A CORPORATION OF DELAWARE

GREASE SEAL FOR UNIVERSAL JOINTS

Application filed February 16, 1929. Serial No. 340,463.

The present invention relates to sealing devices for preventing the leakage of grease between relatively movable members and embodies, more specifically, a grease seal for a universal joint which is so constructed that it effectively prevents any leakage of grease from the joint regardless of the speed of rotation thereof.

There has always been considerable difficulty in preventing universal joints from throwing grease, particularly at high speeds. Where the universal joint is used in connection with auxiliary apparatus, it has been found that this leakage impairs the proper functioning of such auxiliary apparatus. This is particularly true in the case of automobiles where the disc type propeller shaft brake is frequently used, since the grease from the universal joint gets on the brake disc, shoes and lining. The foregoing action has long been recognized and many attempts have been made to prevent the leakage of grease but none of such devices effectively eliminates the throwing of the grease.

An object of this invention is to provide a seal for universal joints which positively prevents the throwing of grease regardless of the speed of rotation of the joint. Supplementing this objective, it is an object of the invention to provide a seal for universal joints, the tightness of which increases with the speed of rotation of the joint.

A further object of the invention is to provide a seal of the above character which is simple in construction and easily mounted within the joint, the parts being easily and cheaply manufactured.

Other objects will be apparent as the invention is described more fully in connection with the accompanying drawing wherein, the single figure is a view in longitudinal section taken through a universal joint to which has been applied a sealing device constructed in accordance with the present invention.

In the above figure $a$ indicates a propeller shaft or other drive shaft which is to be connected to a cooperating driven element $b$ through a universal joint. The specific joint used forms no part of the present invention and, for the purpose of illustration, a joint is shown comprising opposed trunnions $c$ spaced at 90° with respect to trunnions $d$. The frame $e$, carrying trunnions $c$ is supported through the trunnions upon yoke $f$ which is keyed to the shaft $a$ at $g$.

A housing $h$ is secured to the member $b$ and conforms generally to the shape of the joint, the aperture $h'$ therein being of sufficient size to permit the desired degree of angular movement of the members $b$ with respect to the shaft $a$. A cupped flange $i$ is mounted upon the yoke $f$ and seats a spring $j$. This spring bears against a dust shield $k$ which causes the latter to be thrust against the housing $h$. Between the shield and housing an annular packing gland $l$ is provided. Snugly mounted over the stem of the yoke $f$ is a cup-shaped leather washer $m$, the washer lying between the housing and the yoke.

It will be seen that the periphery of the leather cup will be forced outwardly against the housing $h$ by centrifugal force when the joint is rotated. This prevents grease from leaking between the housing and yoke at $h'$ and the tightness of the joint increases with the speed of rotation thereof. The packing gland $l$ serves as an additional seal and the entire structure has been found to prevent, effectively, the throwing of grease under all conditions.

While the invention has been described in connection with the specific construction shown in the accompanying drawing, it is not to be limited, save as defined in the appended claim.

I claim as my invention:

A sealing device for universal joints comprising a rotating element, a yoke carried thereby, a second rotating element, a housing carried by the second element and enclosing the joint, said housing having an aperture to receive the first rotating element, a flexible disc snugly fitting the yoke adjacent the inner side of the aperture to engage the housing, and a dust shield mounted on the yoke and bearing against the outer periphery of the housing.

This specification signed this 7th day of February, A. D. 1929.

AUGUST H. LEIPERT.